United States Patent [19]

Keskkula et al.

[11] Patent Number: 4,460,744
[45] Date of Patent: Jul. 17, 1984

[54] BLENDS OF GRAFTED ACRYLATE POLYMERS AND MASS-MADE ABS-TYPE RESINS

[75] Inventors: Henno Keskkula; Donald A. Maass; Kathleen M. McCreedy, all of Midland, Mich.

[73] Assignee: The Dow Chemical Company, Midland, Mich.

[21] Appl. No.: 255,956

[22] Filed: Apr. 20, 1981

[51] Int. Cl.$^3$ ............................................ C08L 51/00
[52] U.S. Cl. .................................................. 525/71
[58] Field of Search .................. 525/71; 260/4 AR, 5

[56] References Cited

U.S. PATENT DOCUMENTS

| 3,074,906 | 1/1963 | Calvert | 525/71 |
| 4,144,287 | 3/1979 | Kudo | 525/71 |
| 4,150,066 | 4/1979 | Kudo | 525/71 |
| 4,233,409 | 11/1980 | Bulkley | 525/71 |

Primary Examiner—Melvyn I. Marquis
Attorney, Agent, or Firm—R. B. Ingraham

[57] ABSTRACT

Excellently-propertied, physical and intimately-admixed blends of polymers (i.e., "polyblends") comprise in intimate admixtures (A) large particle size, mass-made acrylonitrile/butadiene/styrene (i.e., "ABS")-type resins; and (B) certain grafted and/or interpolymerized rubber concentrates (i.e., "MMA") or MMA copolymers with certain other acrylic and/or vinyl monomers onto predominantly polybutadiene (i.e., "PBD") elastomeric substrate(s).

23 Claims, No Drawings

BLENDS OF GRAFTED ACRYLATE POLYMERS AND MASS-MADE ABS-TYPE RESINS

BACKGROUND OF THE INVENTION

ABS (acrylonitrile-butadiene-sytrene) and ABS-type resins are commercially important and find widespread usage. They are relatively tough and have generally good solvent and impact resisting qualities. These plastics have been known for many years and nicely characterized, by way of illustration, in "ABS Plastics" by Costas H. Basdekis published in 1964 as part of its *Plastics Application Series* by REINHOLD PUBLISHING CORPORATION of New York. Another excellent treatment of more recent presentation is set forth in *Toughened Plastics* by C. B. Bucknall, Applied Science Publishers Ltd., London (1977).

ABS plastics can be satisfactorily made in a variety of ways.

One good route for ABS manufacture is the mass technique, wherein the involved rubber (such as polybutadiene or PBD) is directly dissolved in an appropriate mixture of styrene (i.e., "St") and acrylonitrile (i.e., "AN") followed by polymerization of the mass under the influence of applied effective agitation which is continued at least until the occurrence of the rubber phase inversion; after which polymerization is continued either in mass or in a suitable suspension of the mass in a liquid medium such as water. Polymerization is allowed to proceed to a desired degree of conversion whereupon, usually with completing devolatilization, the desired ABS plastic product is obtained.

Other conventional preparations of ABS resins involve such procedures as: (i) blending any one or more of various suitable rubber latices with St/AN copolymer (i.e., "SAN"); and (ii) polymerizing St and AN in the presence of a preformed rubber in latex form.

Typically, mass-made ABS resins have some inherent limitations. Many of these stem from the fact that since the polymerization of SAN is carried out in the presence of rubber, the viscosity of the system limits the amount of rubber which may be used. Accordingly, ABS compositions with extraordinary impact strength (requiring incorporation therein of relatively large amounts of rubber) are difficult to achieve by this technique.

Along this line, ABS and ABS-type resins prepared by the above-explained mass-made technique are typically characterizable by the relatively large size of the rubber particles therein which are usually in the weight average diameter range of from about 0.3 micron (i.e., "$\mu$"), frequently from about $0.5\mu$ to about $5\mu$ or so.

Thus, nothing in prior art appears to realistically concern itself with an effective means and composing technique for providing tough and impact resisting ABS and ABS-type plastics materials and to get better and more satisfactory products therewith in the way so indigenously advantageous as in the present contribution to the art.

FIELD AND PURVIEW OF THE INVENTION

The present invention concerns remarkably tough polyblends, particularly at low temperatures, and a simple and direct method for their manufacture, of: (A) certain ABS and ABS-type resins; and (B) certain grafted rubber concentrates (i.e., "GRCs"), both as hereinafter more fully specified and in proportions hereinafter more precisely delineated; as well as shaped and fabricated articles and products therefrom.

The achievement and provision of all indicated benefits are amongst the principle aims and objectives of the invention; with even more and additionally other benefits and advantages derivable in and from present practice appearing and becoming more evident in the ensuing description and specification.

SUMMARY OF THE INVENTION

The present invention, and the discovery on which it is based, broadly pertains to highly improved, advantageous and novel, and surprisingly tougher-than-expected ABS, and the like GRC polyblends all in pursuance with and as is in broadest, basic outline set forth is an innately impact resistant and tough polyblend composition that is comprised, in intimate physical admixture, of: as constitutent (A) of the polyblend: between about 65 and about 99 percent by weight taken on total weight of polyblend, per se, in the involved composition (i.e., "wt. %") of a mass-made ABS-type resin that is comprised of:

(i) from about 15 to about 35 parts by weight (i.e., "pbw") of a cyanoalkene of the formula:

wherein: R is selected from the Group consisting of hydrogen and a lower alkyl unit containing not more than about 4 carbon atoms therein;

(ii) from about 85 to about 65 pbw of an alkenyl aromatic monomer of the formula:

wherein G is selected from the Group consisting of hydrogen and methyl and Ar is an aromatic radical including various alkyl- and halo-ring-substituted aromatic units containing from 6 to about 10 carbon atoms; and (iii) between about 5 and about 18 percent by weight reckoned on total weight of the involved composition (i.e., "% by wt.") of a natural or synthetic rubber ingredient (i.e., an "EL");

as constituent (B) of the polyblend: between about 35 and about 1 wt. % of a grafted rubber concentrate (i.e., "GRC") component that is a graft copolymerized product of:

(iv) from about 40 to about 90% by wt. of an EL substrate component upon which there is graft copolymerized;

(v) between about 60 and about 10% weight of a superstrate containing in grafted polymer component form at least about half on weight basis of polymerized monomer of the formula:

wherein each $R_1$ and $R_2$ is independently selected from the Group consisting of hydrogen and lower alkyl units containing not more than about 4 carbon atoms; with any balance of said graft copolymerized superstrate being an other-than-acrylate monomer that is addition copolymerizable with methyl methacrylate (i.e., "MMA").

Also contemplated within the scope of the invention is a method of making a tough polyblend composition comprised of an intimate admixture of the constituents (A) and (B), which method comprises: physically intermixing to practical interblended homogeneity between about 65 and about 99 weight percent of constitutent (A) with between about 35 and about 1 weight percent of constituent (B).

For immediate descriptive purposes, the terms "graft-(ed) polymer or copolymer", "graft polymerized or copolymerized", etc., contemplate and are intended to include what may be called and are actually often referred to as "interpolymers", "interpolymerizing", "interpolymerization products", etc., or monomeric materials, such as methylmethacrylate (i.e., MMA) and so forth, that are polymerized upon and to form attached chain superstrate combinations with preformed, polymerizeably-reactive substrates, such as PBD and so forth; as is all well within the knowledge and comprehension of those skilled in the art.

PARTICULARIZED DESCRIPTION OF THE INVENTION

The present invention, in basic essence and substance, involves physically-ameliorated polyblends of:

(A) Between about 65 and about 99, advantageously from about 70 to about 85, percent by weight of polyblend, per se, in the involved composition (i.e., "wt.%") of a mass-made ABS (which here includes ABS-type) resin or resin mixture constituent that is characterizable in therein containing complex particles that are distinguishable by the included presence of a plurality of discernable SAN (which includes like or equivalent copolymeric entities) occlusions that are in the average particle size range of between about 0.3 and 5µ, more frequently not greater than about 3µ; and (B) A GRC constituent of between about 35 plus and about 1 wt.%, advantageously from about 30 to about 15 wt%, of PBD or equivalent rubbery elastomer (i.e., "EL") based particles having an average particle size on an order of from about 500 to about 5,000 Angstrom units (i.e., "Å") upon which there is emulsion graft copolymerized MMA (which includes its monomeric equivalents and mixtures thereof with MMA and/or its equivalents and their own mixtures or as mixtures thereof with up to about 50 percent by weight reckoned on involved weight of total graft polymerizable monomeric component—i.e., % by wt.—of another other-than-acrylate vinyl monomer or monomer mixture that is copolymerizable with MMA), which GRC is composed of from about 40 to about 90% by wt. of the EL substrate component upon which there is between about 60 and about 10% by wt. of the graft copolymerized superstrate component.

Polyblends in accordance herewith, in one striking and significant aspect thereof, are particularly characterizable in possessing such materially increased properties of impact resistance and toughness such that physical measurements thereof in relevant particulars of same ordinarily provide values that are generally at least one-and-one-half ((1½×) to two-times (2×), and frequently much more, increased over those of the ABS or ABS-type resin, per se, in the novel polyblend(s). Their general resistance to solvent attack is at least equal to that of the involved ABS or ABS-type constituent(s).

To make the polyblends of and in pursuance with the present invention, the desired appropriate proportions of constituents (A) and (B) are generally speaking and by any means appropos, physically admixed in such a way as will ensure very intimate and, for practical purposes, at least homogenous at least to the unaided eye interblending thereof. Most advantageously and generally preferably, the polyblends are prepared by melt blending of the respective constituents by mechanical admixture thereof on or in intensive compounding apparatus (such as, but not limited to extruders, masticating roll assemblies or the 2-roll mill and the like type, Banbury mixers and so forth) at a temperature adequate to thermoplasticize the constituents being mixed but less than that which might occasion appreciable polymer decomposition therein or thereof.

The ABS, etc./GRC polyblends pursuant to this invention can, if desired or required, be provided with and contain other additaments that are oftentimes included in such compositions, such as, by way of illustration: antioxidants; pigments; dyes; fillers (both pulverulant, particulate or fibrous); stabilizers; mineral oil and other plasticizers; blowing agents; and so forth.

As is also evident and will be apparent to those skilled in the art, the finally-obtained physical properties and other characteristics of the present polyblends depend, to greater or lesser extents and as can occur or be altered in and with given compositions, on both the particular types of ABS and GRC constituents employed, (including such factors as weight average molecular weight—i.e., "$M_w$,"—therefor, presence or absence of various additives, etc.); and/or the EL utilized therein (including such factors as degree of crosslinking architectural structure, precise composition, the included EL proportion(s), etc.). A literal myriad of designable product variation and possibilities, with differing advantageous end use capabilities and adaptabilities, are obtainable by component and composition selection(s) pursuant to the instantly-disclosed practice(s).

The composition of the mass-made ABS resin(s) employed as constituent (A) in practice of the present invention (and as may be satisfactorily obtained, for example, along the lines taught in the above-noted U.S. Pat. No. 3,627,885) usually contains interpolymerized therein from about 15 to 35 parts to weight (i.e., "pbw") AN and from about 85 to 65 pbw St with between about 5 and about 18% by wt. PBD.

Equivalent ABS-type resins for instant purposes can be prepared with component variations in place of or in mixture with the respective AN, St and PBD ingredients.

Thus, in and for the ABS-type resin, other cyanoalkylenes may be utilized along with or in place of AN. These, such as α-methacrylonitrile, are of the formula (which includes AN):

$$CH_2=\underset{\underset{R}{|}}{C}-CN, \qquad (I)$$

wherein R is selected from the Group consisting of hydrogen and lower alkyl units containing not more than about 4 carbon atoms.

Likewise, besides the ordinarily-preferable St and in place of or mixture(s) therewith, other alkenyl aromatic monomers may be utilized. These are of the formula (which includes St):

wherein G is selected from the Group consisting of hydrogen and methyl and Ar is an aromatic radical (including various alkyl and halo-ring-substituted aromatic units) of from 6 to about 10 carbon atoms. These, frequently quite satisfactorily, include: α-methyl styrene; vinyl toluene; vinyl naphthalene; the dimethyl styrenes, t-butyl styrene; the several chlorostyrenes (such as the mono- and dichloro-variants); the several bromostyrenes (such as the mono- and dibromovariants); and so forth.

As the ABS or ABS-type EL component of which Constituent (A) is comprised, as well as for the rubbery elastomer substrate component in the constituent (B), PBD is oftentimes preferred.

However, the EL utilized in preparation of both constituents (A) and (B) may also be satisfactorily selected from a wide variety of generally sulfur-vulcanizable materials or mixtures thereof additional to PBD. It can, for example, be natural rubber (otherwise known as *Hevea brasiliensis*). Much more often, however and as the case with PBD, it is a conjugated diolefin (homo-)polymer synthetic rubber (or elastomeric inter or copolymer composition of between about 25 and 90 wt.%) of a 1,3-diene of the formula:

wherein X is selected from the Group consisting of hydrogen, chlorine and methyl radicals.

Such conjugated diolefin polymer synthetic rubbers are polymers as is above-indicated, of: butadienes-1,3, e.g., butadiene-1,3 (i.e., "BD"); iosprene; 2,3-dimethyl-butadiene-1,3; and copolymers of mixtures of one or more such BD's (in a proportion of at least about 75% by wt. of such BD's) and, for example, of up to 25% by wt. the entire copolymerizable mass in such mixture of one or more monoethylenic compounds which contain a

grouping, wherein at least one of the connected $R_1$ and/or $R_2$ valences is attached to an electronegative group, that is, a group which substantially increases the electrical dissymmetry or polar character of the molecule.

Examples of compounds which contain the formula (IIIA) grouping and are copolymerizable with BD's are: the formula (II) monomers, especially St; the unsaturated carboxylic acids and their esters, nitriles and amides, such as acrylic acid, methyl acrylate, ethyl acrylate, MMA, AN, α-methacrylonitrile, methacrylamdie; vinylpyridines, such as 2-vinylpyridine, 2-methyl-5-vinylpyridine; methyl vinyl ketone; and methyl isopropenyl ketone—all of which besides those above-mentioned in connection with the (A) and (B) Constituents are also copolymerizable with St and/or MMA (disregarding, for the explanation, MMA itself).

Examples of such conjugated diolefin polymer synthetic rubbers are, besides, PBD: polyisoprene; BD/St copolymers (i.e., "SBR"); and BD/AN copolymers. The synthetic rubber may be solution-prepared or emulsion-prepared, be it a stereo-specific variety or otherwise.

Other conventional unsaturated sulfur-vulcanizable rubbers may also be used as the EL material such as "EPDM" (a rubbery terpolymer of ethylene, propylene and a copolymerizable non-conjugated diene such as 1,4-hexadiene, dicylopentadiene, dicylooctadine, methylenenorbornene, ethylidenenorbornene, tetrahydroindene, etc.). The analogous fluorocarbon, silicone and polysulfide rubbers may also be employed as an EL.

The ABS, etc./GRC polyblends may be diblends, triblends or even blends of a greater number of involved polymeric ingredients, including, polyblend mixtures of one or more suitable (A) and (B) Constituents.

The MMA or equivalent monomers which are graft copolymerized, as a superstrate, upon the PBD or other EL to provide the GRC Constituent (B) for the polyblends of the present invention are of the general formula (which includes MMA):

wherein each $R_1$ and $R_2$ is independently selected from the Group consisting of hydrogen and lower alkyl units containing not more than about 4 carbon atoms. Besides MMA, ethyl methacrylate and propyl and isopropyl methacrylate are, inter alia, good exemplifications of formula (IV) monomers useful to replace or for employment in combination with MMA for preparation of the (B) GRC Constituents in practice of the present invention.

When the graft copolymerized superstrate in the GRC for Constituent (B) comprises mixtures of formula (IV) monomers with other-than-acrylate monomers that are copolymerizable with other than MMA, the latter, and advantageously more specifically in addition to those identified in the foregoing in connection with the utilizable EL materials, may be or include any of such addition polymerizable vinyl monomers, or mixtures thereof, as: (i) vinyl halides, particularly vinyl chloride; (ii) various vinyl organic acid esters such as vinyl acetate, vinyl propionate, etc.; (iii) vinylidene chloride; (iv) acrylic and methacrylic acid; and (v) maleic anhydride; as well as (vi) any of the above-mentioned formula II monomers.

In all of this, the basic principles and limitations relevant to polymerizations, copolymerizations and graft- and inter-polymerizations as well as the provision of both ABS and ABS-type plastics (additional to those above precised) and GRC sorts of graft copolymers are so widely known to and comprehended by those skilled in the art that detailed elaboration thereon is herein neither made nor attempted; the same being unnecessary for thorough understanding and recognition of the advance possibilitated by the contribution(s) of the instant development.

EXEMPLIFICATION OF THE INVENTION

The following illustrative examples show the great benefit of reduction to practice of the present invention. In them, all parts and percentages are given and to be taken on a weight basis and all temperature readings (unless otherwise specified) are in degrees Centrigrade (or, as is preferred for International use, degrees Celsius, i.e., "°C.").

First Illustration

A stirred 3-liter reactor equipped with a heating bath was employed to carry out an emulsion grafting reaction of MMA onto a prepared PBD substrate in latex form. The initial charge to the reactor comprised: 957 gms. of 44 percent solids content PBD latex obtained commercially from THE FIRESTONE TIRE & RUBBER COMPANY under the trade designation "SR6747" with the rubber particles therein characterized in having an 1190 Å volume mean diameter; 668 gms of deionized water; 5.62 gms. of "CALSOFT-40" emulsifier (an alkyl aryl sulfonic acid salt); and 3.75 gms. of an aqueous ferric nitrate solution of a strength giving 0.002 gm. of ferric ion. Immediately after charging, the reactor was purged of oxygen by three successive cycles of evacuation followed by nitrogen flushing. At this point, 0.056 gm. of "FORMAPON" (sodium formaldehyde sulfoxylate) dissolved in 12 gms. of water was added to the charge. The reactor bath was then heated to 70°.

Reaction was commenced by pump feeding to the charge in the reactor at a 50 cc/hr. rate a mixture of 140 gms. MMA and 0.7 gm. n-octyl mercaptan. Ten minutes after start of the MMA feed, a separate feed stream was begun to incorporate in the charge, at a pump-regulated rate of 42 cc/hr., a mixture of 117 gms. water, 6.7 gms. "CALSOFT-40" and 0.08 gm. sodium persulfate. The pumping of the two separate feed streams was continued for 3 hrs., at which time all of the indicated quantities of both reagent feeds had been delivered.

At this point, 50 ml. of a 1.6% solution of the monomethyl ether of hydroquinone was added to the reaction mass in order to terminate the reaction. A dispersion of "IRGONOX 1076" (a phenol antioxidant obtained from CIBA-GEIGY CORPORATION) was then incorporated in the completed reaction mass in an amount adequate to provide 0.6 pbw of the antioxidant per each 100 pbw of PBD therein present.

The completed reaction mass was then steam stripped leaving a GRC latex product having total solids content of 28.4% (representing an 82.5% conversion of MMA in the reaction). This was coagulated by freezing, after which the crumb obtained was thoroughly washed and dried under reduced pressure at 60°. The rubber content in the GRC crumb was 77.7%.

Second Illustration

The dried GRC crumb obtained by the preparation of the First Illustration was blended with a mass-made ABS resin (containing 13.5% rubber and obtained from THE DOW CHEMICAL COMPANY under the trade designation "DOW ABS 500").

The blending was done on a steam heated, 3×8 inch (7.62×20.32 centimeter) two-roll mill. The front roll in the pair was heated by steam under a pressure of 230 to 250 psig. The back roll was not heated. The ABS was first put between the rolls of the mill and melted. The GRC crumb was then added to the molten ABS. After the GRC inclusion, the composite was milled for an additional 5 minutes with frequent folding of the polyblend blanket being made. After the blending, the polyblend was compression molded into a ⅛ inch (0.3175 centimeter) thick sheet from which suitably sized specimens were routed. Mechanical properties testing of the specimens was conducted by appropriate ASTM procedures. The results obtained were as are set forth in the following Table I, in which Sample "A" is a milled control product of the "DOW ABS 500", per se, and Sample "B" is the polyblend product made from the ABS and GRC composite as above-described.

TABLE I

| | Basic Physical Property Comparison | | | |
|---|---|---|---|---|
| | | Notched Izod (N.I.) ft-lb/in | | Melt Flow Rate Condition |
| Sample | % Rubber | @73° F. (22.8°) | 0° F. (−17.8°) | "I", gms/10 min (i.e., "M.F.R.") |
| "A" | 13.5 | 2.4 | 1.5 | 3.6 |
| "B" | 23.0 | 12.8 | 8.2 | 0.1 |

Third Illustration

A series of polyblends was prepared to demonstrate the advantageous flexibility of various products prepared in accordance with the present invention particularly as regards achievement of outstanding enhancements in product toughness in useful ranges of the GRC component made with varying levels of grafting therein from relatively very low to relatively very high.

To do this, the grafting procedure described in the First Illustration was altered by changing the amount of MMA introduced into the reaction mass. Also, the seed EL employed was a 90%:7%:3% BD/St/AN terpolymer in 32.0% solids content latex form having a volume means particle size of 1810 Å. In each case, the final GRC latex product was coagulated with alum solution then washed and dried.

The blending of the involved GRCs with "DOW ABS 500" was done pursuant to the procedure of the Second Ilustration. Each of the blends had a total rubber (EL) content of 20%. The physical properties of the several product polyblends were as is set forth in the following Table II.

TABLE II

| | Comparison of Several Polyblends | | | |
|---|---|---|---|---|
| | % Rubber | % GRC In | Composite Properties | |
| Sample | In GRC | Polyblend | N.I. | M.F.R. |
| "C" | 30.8 | 37.6 | 5.0 | 1.9 |
| "D" | 40.9 | 23.7 | 6.1 | 2.0 |
| "E" | 52.2 | 16.8 | 8.2 | 1.2 |
| "F" | 64.1 | 12.8 | 8.4 | 1.1 |
| "G" | 76.4 | 10.3 | 8.3 | 1.1 |
| "H" | 84.5 | 9.2 | 8.3 | 0.9 |

By way of further comparison, a sample of the freshly coagulated seed EL terpolymer (without any grafting thereon) was also blended with the "DOW ABS 500". The resulting product was noticeably non-uniform and unacceptably brittle in physical character.

Fourth Illustration

To show the adaptability and capability of use of various ELs in practice of the invention, a series of polyblends was prepared by repetition of the Third Illustration excepting to utilize different ELs as the seed rubber material. As in the Third Illustration, the polyblends were prepared by blending each GRC with "DOW ABS 500" to a total EL content of 20%. The identification of the several ELs utilized and the results of physical testing of each of the product polyblends were as is set forth in the following Table III.

TABLE III

Comparison of Additional Polyblends of Various EL's In The GRC Component

| Sample | EL Type | % Solids In Seed Latex | Volume Mean Diameter of El, Å | % EL In GRC | N.I. | M.F.R. |
|---|---|---|---|---|---|---|
| "I" | PBD | 52.2 | 2640 | 54.7 | 6.5 | 1.0 |
| "J" | BD/St/AN (75%:15%:10%) | 26.0 | 1110 | 52.5 | 7.0 | 1.8 |
| "K" | PBD | 44.0 | 1190 | 52.9 | 10.3 | 0.3 |
| "L" | PBD | 44.0 | 1190 | 77.6 | 10.4 | 0.4 |
| "M" | BD/St/AN (90%:7%:3%) | 35.0 | — | 77.6 | 9.2 | 0.8 |
| "N" | BD/n-BuAc* (75%:25%) | — | — | 50.5 | 4.2 | 2.1 |

*n-butyl acrylate

Fifth Illustration

Following the foregoing procedures, a GRC of 100% MMA on 53.6% terpolymer rubber (the same EL as employed in the Third Illustration) was prepared. To give Sample "O", 21.0 pbw of the GRC was blended with 113.1 pbw of "DOW ABS 500" so that the resultant polyblend contained 20% overall rubber in its total composition. Sample "P", having 30% total rubber therein, was made by blending 55.5 pbw of the GRC and 79.5 pbw of the ABS. The physical testing results of these Samples are set forth in the following Table IV.

TABLE IV

Showing EL Variations In Polyblends

| Sample | N.I. | M.F.R. | $T_y^1$ | $El_y^2$ | $T_r^3$ | $El_r^4$ | Mod.[5] |
|---|---|---|---|---|---|---|---|
| "O" | 7.3 | 1.8 | 5160 | 2.4 | 4240 | 5.0 | 2.8 |
| "P" | 6.5 | 0.12 | 4040 | 3.4 | 3110 | 17.3 | 2.1 |

[1] Tensile yield strength in psi
[2] Elongation at yield, %
[3] Tensile strength at rupture in psi
[4] Elongation at rupture, %
[5] Tensile modulus psi × $10^5$

Sixth Illustration

To demonstrate at least commensurate results obtainable in practice of the present invention when other mass-made ABS resins are utilized in place of the "DOW ABS 500" type, another series of polyblends were prepared with a GRC prepared generally as in the First Illustration (containing 52.9% combined PBD) blended: (i) for Samples "R" through "U", inclusive, with a mass-made ABS-containing 12% BD rubber and having a volume average particle size of 0.85μ; and (ii) for Samples "W" through "Z'", inclusive, another mass-made ABS-containing 8% BD rubber and having a volume average particle size of 2.2μ. Sample "Q" was the unblended 12% rubber ABS and Sample "V" was the unblended 8% rubber ABS.

The test results of these Samples are as set forth in Table V which follows.

TABLE V

Comparison of Polyblends From Varied ABS Resins

| Sample | % ABS In Polyblend | % GRC In Polyblend | % Total EL | N.I. | M.F.R. | Vicat, °C. |
|---|---|---|---|---|---|---|
| "Q" | 100 | 0 | 12 | 2.2 | 5.2 | 105 |
| "R" | 92.7 | 7.3 | 15 | 5.3 | 1.8 | 106 |
| "S" | 87.8 | 12.2 | 17 | 8.5 | 0.6 | 105 |
| "T" | 82.9 | 17.1 | 19 | 10.2 | 0.2 | 106 |
| "U" | 78.0 | 22.0 | 21 | 10.2 | 0.1 | 106 |
| "V" | 100 | 0 | 8 | 2.2 | 6.7 | 100 |
| "W" | 95.5 | 4.5 | 10 | 3.5 | 4.1 | 103 |
| "X" | 91.1 | 8.9 | 12 | 5.2 | 2.3 | 103 |
| "Y" | 86.6 | 13.4 | 14 | 6.9 | 1.2 | 101 |
| "Z" | 82.2 | 17.8 | 16 | 8.6 | 0.7 | 103 |
| "Z'" | 77.7 | 22.3 | 18 | 9.1 | 0.3 | 104 |

Seventh Illustration

To show the effect of variation in GRC composition(s), a series of GRCs on the same PBD as used in the First Illustration was made. The results of testings on polyblends of these materials with "DOW ABS 500" (in resulting compositions having 23% total EL therein, each of which contained approximately 15% of the particular GRC) is set forth in the following Table VI.

TABLE VI

Comparison of Differing GRC Components In Polyblends

| Sample | GRC Composition | % EL In GRC | N.I. 73° F. | N.I. 0° F. | M.F.R. |
|---|---|---|---|---|---|
| "AA" | MMA (100%) | 77.7 | 12.8 | 8.2 | 0.11 |
| "BB" | MMA/St (90%:10%) | 78.2 | 10.8 | 7.6 | 0.96 |
| "CC" | MMA/St (80%:20%) | 78.8 | 7.9 | 3.3 | 0.03 |
| "DD" | MMA/St (70%:30%) | 77.7 | 5.7 | 1.6 | 0.11 |
| "EE" | MMA/St (50%:50%) | 80.1 | 3.9 | 1.3 | 0.41 |
| "FF" | St (100%) | 82.7 | 1.7 | 0.9 | 1.1 |

Eighth Illustration

To demonstrate the results of practice using additionally varied GRCs made with combinations of MMA and (in one instance) St with other acrylate monomers additional to n-butyl acrylate (i.e., n-BuAc), a series of polyblends having an overall EL content of 20% were prepared in pursuance of the foregoing procedures using such other monomers besides n-BuAc in the preparations as: methyl acrylate (i.e., "MA"), sec. butyl acrylate (i.e., "s-BuAc") and tert.-butyl acrylate (i.e., "t-BuAc"). The precisely involved GRC compositions and the results of testings of the indicated polyblends made therewith are included in the following Table VII.

TABLE VII

Comparison of GRC Components with Various Acrylate Constituents Therein In Polyblends

| Sample | GRC Composition | % EL In GRC | N.I. 73° F. | N.I. 0° F. | M.F.R. |
|---|---|---|---|---|---|
| "GG" | MMA/MA (80%:20%) | 54.6 | 10.4 | 8.0 | 0.07 |
| "HH" | MMA/MA (80%:20%) | 79.4 | 11.3 | 7.2 | 0.5 |
| "II" | MMA/sec-BuAc (80%:20%) | 80.8 | 10.5 | 7.9 | 0.24 |
| "JJ" | MMA/n-BuAc (80%:20%) | 77.6 | 12.3 | 8.1 | 0.04 |
| "KK" | MMA/n-BuAc (70%:30%) | 78.1 | 10.9 | 7.5 | 0.15 |
| "LL" | MMA/t-BuAc (80%:20%) | 79.2 | 11.8 | 8.0 | 0.96 |
| "MM" | MMA/MA (70%:30%) | 80.2 | 11.7 | 8.1 | 0.07 |
| "NN" | MMA/MA (50%:50%) | 81.6 | 8.1 | 5.7 | 0.13 |
| "OO" | St/MA (50%:50%) | 83.6 | 1.6 | 1.0 | 1.6 |

Ninth Illustration

In order to show the value of utilizing various commercial acrylic impact modifiers in practice of the present invention, three different "ACRYLOID" products (Samples "QQ", "RR" and "SS") were blended with "DOW ABS 500" and tested in comparison with the ABS alone (Sample "PP"). As is known to those skilled in the art, "ACRYLOIDS", available commercially from ROHM & HAAS COMPANY, are believed to be emulsion made, spray-dried St/BD/MMA modifiers (generally utilized for polyvinylchloride) containing about 40-55% BD as St/BD rubber (25%:75%) which is grafted with MMA/ethyl acrylate copolymer. "ACRYLOID KM-611" used in Sample "QQ" contained 24.5% MMA (calculated by oxygen analysis) and % gel of 94.4 with $T_g$ for its rubber phase of −68°. In Sample "TT" the "ACRYLOID-607N" contained 38.9% MMA and had a gel % of 94.2 with a rubber phase $T_g$ of −52° and a rigid phase $T_g$ of 67°.

The physical testing results obtained with the involved Samples are set forth in Table VIII.

TABLE VIII

"ACRYLOID" Blends

| Sample | ABS to "ACRYLOID" Ratio (pbw) | N.I. | M.F.R. |
|---|---|---|---|
| "PP" | 100:0 | 3.1 | 2.4 |
| "QQ" | 69:31 | 6.0 | 0.1 |
| "RR" | 69:31 | 4.7 | 0.2 |

Although of lesser relative magnitudes than those presented with other GRCs in the preceding illustrations, the results with Samples "QQ" and "RR" do emphatically illustrate the significant and unexpected improvement in important physical properties realizable in practice of the present invention even when relatively high polymerized MMA content GRCs are being utilized. The same valid observation is applicable to the showing demonstrated in the concluding Tenth Illustration.

Tenth Illustration

Two additional polyblends in accordance with the present invention were prepared following the above-explained procedure from a commercial graft copolymer of MMA and "HEVEATUFF P1350" rubber and "DOW ABS 500". Sample "SS" contained 95% of the ABS while Sample "TT" contained 85% of the ABS. The results are shown in Table IX.

TABLE IX

"HEVEATUFF" Polyblends

| Sample | N.I. | M.F.R. |
|---|---|---|
| "SS" | 4.4 | 2.4 |
| "TT" | 7.1 | 1.1 |

Generally similar favorable results are obtained in pursuit of the invention by making polyblends of different GRCs (utilizing different ELs therein) and different ABS and ABS-type resins in place of those employed in the foregoing Illustrations but within the heretofore-disclosed compositional parameters for same.

Many changes and modifications can readily be made and adapted in specifically altered embodiments in accordance with the present invention without substantially or materially departing from its apparent and intended spirit and scope, all in pursuance and accordance with same as it is set forth and defined in the hereto-appended claims.

What is claimed is:

1. An innately impact resistant and tough polyblend composition that is comprised, in intimate physical admixture, of: as constituent (A) of the polyblend: between about 65 and about 99 percent by weight taken on total weight of polyblend, in the involved composition of a mass-made ABS-type resin that is comprised of:

(i) from about 15 to about 35 parts by weight of a cyanoalkene of the formula:

wherein: R is selected from the Group consisting of hydrogen and a lower alkyl unit containing not more than about 4 carbon atoms therein;

(ii) from about 85 to about 65 parts by weight of an alkenyl aromatic monomer of the formula:

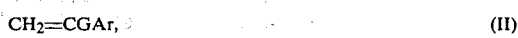

wherein G is selected from the Group consisting of hydrogen and methyl and Ar is an aromatic radical including various alkyl- and halo-ring-substituted aromatic units containing from 6 to about 10 carbon atoms; and (iii) between about 5 and about 18 percent by weight reckoned on total weight of the involved composition of a natural or synthetic rubber ingredient;
as constituent (B) of the polyblend: between about 35 and about 1 weight percent of a grafted rubber concentrate component that is a graft copolymerized product of:

(iv) from about 40 to about 90% by wt. of a rubber substrate component upon which there is graft copolymerized;

(v) between about 60 and about 10% weight of a superstrate containing in grafted polymer component form at least about half on weight basis of polymerized monomer of the formula:

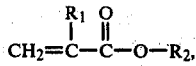 (IV)

wherein each $R_1$ and $R_2$ is independently selected from the Group consisting of hydrogen and lower alkyl units containing not more than about 4 carbon atoms; with any balance of said graft copolymerized superstrate being an other-than-acrylate monomer that is addition copolymerizable with methyl methacrylate.

2. A polyblend composition in accordance with that of claim 1, wherein the physical admixture thereof contains between about 70 and about 85 wt. % of said constituent (A).

3. A polyblend composition in accordance with that of claim 1, wherein said constituent (A) is distinguishable in having: complex included particulate structures therein featuring
   (a) particles that contain discernible occlusions of copolymeric formations of monomers of the Formulae (I) and (II); with
   (b) an average size of the rubber particles therein being on a diametrical range order of between about 0.3 microns and about 5 microns.

4. The polyblend composition of claim 3 in which the average particle size range of said rubber particles is between about 0.5 micron and about 3 microns.

5. A polyblend composition in accordance with that of claim 1, wherein the cyanoalkene of formula (I) is acrylonitrile.

6. A polyblend composition in accordance with that of claim 1, wherein the cyanoalkene of formula (I) is α-methacrylonitrile.

7. A polyblend composition in accordance with that of claim 1, wherein the alkenyl aromatic monomer of formula (II) is styrene.

8. A polyblend composition in accordance with that of claim 1, wherein the rubber in said ABS-type resin of constituent (A) is polybutadiene.

9. A polyblend composition in accordance with that of claim 1, wherein: the cyanoalkene of formula (I) is AN; the alkenyl aromatic monomer of formula (II) is St; and the rubber in said ABS-type resin is polybutadiene.

10. A polyblend composition in accordance with that of claim 1, wherein said monomer of formula (IV) is methyl methacrylate.

11. A polyblend coposition in accordance with that of claim 1, wherein all of said graft copolymer superstrate component in constituent (B) is polymerized monomer of the formula (IV) or mixtures thereof.

12. A polyblend composition in accordance with that of claim 1, wherein all of said graft copolymer superstrate component in constituent (B) is polymerized methyl methacrylate.

13. A polyblend composition in accordance with that of claim 1, wherein any of said balance of said graft copolymer superstrate component in constituent (B) that is copolymerized with monomer(s) of the formula (IV) is an other-than-acrylate monomer copolymerizable with methyl methacrylate.

14. Other-than-acrylate monomer(s) graft copolymerized in said superstrate in a composition pursuant to that of claim 13 which are selected from the group consisting of: vinyl halides, vinyl organic acid esters; vinylidene chloride; acrylic acid; methacrylic acid; maleic anhydride; alkenyl aromatic monomers of the formula (II); and mixtures thereof.

15. A polyblend composition that is in accordance with any one of those set forth in claim 1, and which is further characterizable in having impact resistance and toughness properties, when molded into shaped article form, that are at least about two times as much as those of the ABS-type resin, in the polyblend.

16. The method of making a tough polyblend composition comprised of an intimate admixture of the constituent (A) which is a polyblend of between about 65 and about 99 percent by weight taken on total weight of polyblend, in the involved composition of a mass-made ABS-type resin that is comprised of:
   (i) from about 15 to about 35 parts by weight of a cyanoalkene of the formula:

 (I)

wherein: R is selected from the Group consisting of hydrogen and a lower alkyl unit containing not more than about 4 carbon atoms therein:
   (ii) from about 85 to about 65 parts by weight of an alkenyl aromatic monomer of the formula:

 (II)

wherein G is selected from the group consisting of hydrogen and methyl and Ar is an aromatic radical including various alkyl- and halo-ring-substituted aromatic units containing from 6 to about 10 carbon atoms; and
   (iii) between about 5 and about 18 percent by weight reckoned on total weight of the involved composition of a natural or synthetic rubber ingredient; and constituent (B) which is a polyblend of between about 35 and about 1 weight percent of a grafted rubber concentrate component that is a graft copolymerized product of:
   (iv) from about 40 to about 90 weight percent of a rubber substrate component upon which there is graft copolymerized;
   (v) between about 60 and about 10 weight percent of a superstrate containing in grafted polymer component form at least about half on weight basis of polymerized monomer of the formula:

 (IV)

wherein each $R_1$ and $R_2$ is independently selected from the Group consisting of hydrogen and lower alkyl units containing not more than about 4 carbon atoms; with any balance of said graft copolymerized superstrate being an other-than-acrylate monomer that is addition copolymerizable with methyl methacrylate
   which method comprises: physically intermixing to practical interblended homogeneity between about 65 and 99 weight percent of constituent (A) with between about 35 and about 1 weight percent of constituent (B).

17. A method according to that of claim 16, wherein between about 70 and about 85 weight percent of constituent (A) is intermixed with between about 30 and about 15 weight percent of constituent (B).

18. Accomplishing the method of claim 16 by melt blending constituent (A) and constituent (B) under the influence of intensive mechanical admixing at a temperature that is sufficiently high to thermoplasticize both of said constituents but not of such elevation as to cause appreciable thermal degradation thereof.

19. An impact resistant and physically tough especially at low temperatures, shaped article fabricated from a polyblend composition that is in accordance with the composition set forth and delineated in claim 1.

20. The shaped article of claim 19 in the form of a sheet.

21. A shaped article in accordance with that of claim 19 which is further characterizable in possessing increased physical properties of impact resistance and toughness that are increased in comparison by at least one-and-one-half times over that of the ABS-type resins, in the composition from which said article is fabricated.

22. A shaped article in accordance with that of claim 20 which is further characterizable in possessing increased physical properties of impact resistance and toughness that are increased in comparison by at least one-and-one-half times over that of the ABS-type resins, in the composition from which said article is fabricated.

23. A shaped article according to either of those of claims 21 or claim 22, wherein said comparative physical property increase is on an order of at least about twice.

* * * * *